Jan. 15, 1952 C. A. PORTER ET AL 2,582,794
METHOD FOR VAPORIZING SULFUR
Filed May 23, 1946

INVENTORS
Charles A. Porter
George W. Rollin
BY Edward H. Lang
ATTORNEY

Patented Jan. 15, 1952

2,582,794

UNITED STATES PATENT OFFICE 2,582,794

METHOD FOR VAPORIZING SULFUR

Charles A. Porter and George W. Rollin, Chicago, Ill., assignors to The Pure Oil Company, Chicago, Ill., a corporation of Ohio Application May 23, 1946, Serial No. 671,681

2 Claims. (Cl. 23—224)

This invention relates to method and apparatus for vaporizing sulfur. In the vaporization of crude sulfur difficulty is experienced because of clogging of the heater due to the presence of solid carbonaceous and common mineral matter and other foreign materials in the crude sulfur, thereby interfering with continuous operation of the vaporizer.

One of the objects of our invention is to provide a continuous method for vaporizing crude sulfur.

Another object of our invention is to provide apparatus for the continuous vaporization of crude sulfur.

Figure 1:
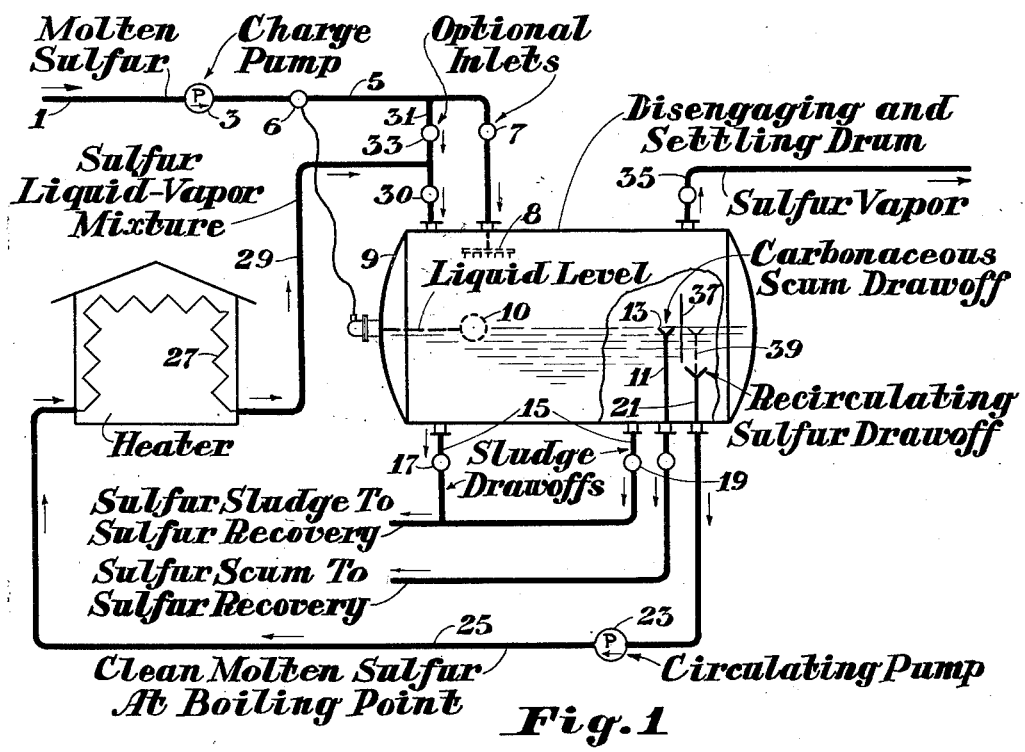
Figure 2:
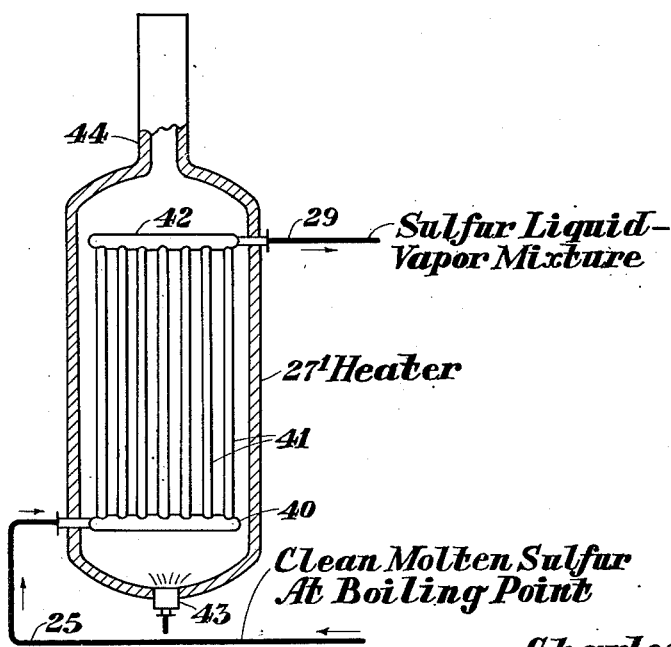

Other objects of the invention will appear from the following description and accompanying drawing of which Figure 1 is a diagrammatic, elevational view of the apparatus in accordance with our invention; and Figure 2 is a view partly in vertical cross-section of a modified form of heater for use in the apparatus shown in Figure 1.

Referring more particularly to the drawing, the numeral 1 indicates a line through which molten sulfur is charged by means of pump 3, line 5, valves 6 and 7 and distributor head 8 into drum 9. The crude molten sulfur before it is charged to line 1 is heated to a temperature sufficient to liquify the sulfur, but not in excess of about 150° C. Care should be exercised not to heat the sulfur to a temperature at which it becomes viscous.

A body of liquid sulfur is maintained in the drum 9 at a level determined by float or other liquid level 10. A line 11 is provided with its upper end at the surface of the molten body of sulfur to withdraw carbonaceous scum which forms on the surface of the molten sulfur. The upper end of the withdrawal line 11 is preferably provided with a wide-mouth opening 13 in order to facilitate the discharge of the carbonaceous scum. If desired, more than one scum withdrawal line may be provided. Scum is preferably withdrawn intermittently. The scum withdrawn from the surface of the molten sulfur may be treated to recover the sulfur contained therein or the scum may be otherwise disposed of. Any sludge which may settle out of the sulfur is withdrawn from the bottom of the drum 9 through withdrawal lines 15, controlled by valves 17 and 19. The sludge withdrawal may be intermittent or continuous depending upon the amount of sludge which settles to the bottom of the drum. A suitable sight-glass (not shown) may be provided on the outside of the drum in order to determine the level of the sludge in the drum.

Molten or liquid sulfur is withdrawn from the drum 9 from a point intermediate the top and bottom of the layer of molten sulfur by means of line 21, pump 23 and line 25 and charged to a heating coil 27 located in a suitable furnace or heater. In the coil 27 the molten sulfur is heated to a temperature above 450° C. in order that the sulfur will at least in part be converted to vapor in the drum 9. From the heating coil 27 the sulfur vapor or liquid, as the case may be, depending upon the pressure, passes through line 29 and valve 30 and enters the top of the drum 9. If desired, a part or all of the crude sulfur charge may be mixed with the heated sulfur mixture entering the drum 9 through line 29 by causing the crude molten sulfur or a part thereof to pass through line 31 controlled by valve 33. The temperature in the drum 9 is maintained above 445° C. in order to permit sulfur to vaporize and escape from the top of the drum through vapor line 35.

The drum 9 should be of sufficient size to permit sufficient time for the sludge to settle out of the sulfur. We prefer to have the drum of such size that approximately thirty minutes is required to fill the drum with crude molten sulfur to the level of the sulfur recirculating line when pump 3 is operating at normal speed. The time element may be more or less than thirty minutes depending upon the quality of the crude sulfur charged—less time being required for sulfur of relatively high purity and more time being required for sulfur of relatively low purity.

The crude molten sulfur inlet enters the drum 9 at the end opposite that from which sulfur is withdrawn for circulation and scum is removed from the surface of the molten sulfur, thereby permitting the scum to rise to the surface and the sludge to settle before the sludge reaches the point of the scum and sulfur recycle draw-offs. We prefer to introduce crude sulfur into the drum above the level of the molten sulfur in order to avoid agitation of the body of molten sulfur.

If desired, a vertical imperforate baffle, shown in the drawing as 37, may be placed across the drum between scum draw-off 11 and the recirculating line 21. The baffle will extend above the level of the sulfur body, but will not extend to the bottom of the drum, thereby permitting passage of liquid from one end to the other end of the drum beneath the baffle. By using a baffle the sulfur recirculating withdrawal line 21 can extend approximately to the top of the sulfur body, as indicated in the drawing by dotted line 39, without running the risk of having scum pass into the recirculating line. By moving the top of the recirculating line 21 to the surface of the molten body, the likelihood of sludge passing into a recirculating line is substantially eliminated.

Liquid level control 10 is adapted to open and close valve 6 in line 5, thereby functioning to hold the level in the drum 9 constant. The recirculating rate through line 21, pump 23, line 25 and heater 27 is held constant. The firing of the heater may be regulated by a conventional furnace firing control system regulated by temperature and/or pressure in the drum 9 in order to provide the required volume of sulfur vapor through the line 35 at the established temperature and pressure. Thus, when the pressure in the drum 9 increases thereby indicating an increase in the amount of sulfur vapor being produced, the heat in the heater will be cut down and vice versa. When the pressure of the sulfur vapors is reduced below a given point, the amount of heat in the heater will be increased.

As previously pointed out, sludge and scum may be drawn-off intermittently or continuously. We prefer to withdraw the scum and sludge intermittently by manual control or by means of a cycle controller which will periodically permit sludge and scum to be withdrawn from the drum.

The temperature at which sulfur vapor leaves the drum 9 will depend on the purpose for which the sulfur vapor is to be used. Where the sulfur is to be condensed to solid sulfur, the temperature of vaporization will be only slightly above the boiling point of the sulfur. Where the sulfur is used for chemical processing, the sulfur may in some cases be heated directly in the boiler to reaction temperature by maintaining the boiled pressure at a suitable value; in other cases the sulfur vapors from the boiler may be further heated in an outside superheating section. For example, in the preparation of $CS_2$ by reaction of sulfur vapors and hydrocarbon gases such as methane, the sulfur may be vaporized at such a pressure that the vapor escaping through line 35 may be at a temperature of 600–700° C. or the vaporization may take place at substantially atmospheric pressure and corresponding temperature followed by subsequent superheating to desired reaction temperature at substantially atmospheric pressure. The choice may depend on the pressure at which it is desired to operate the $CS_2$ reaction.

The sulfur boiler serves as a receptacle to which molten sulfur is returned and in which it is boiled, has impurities removed and sulfur vaporized for use in subsequent reactions. By regulation of the pressure in the boiler, sulfur vapor at various degrees of superheat can be obtained. The specific application mentioned, that the sulfur vapor is to be prepared for reaction in carbon disulfide synthesis operations, is only one example of uses to which the sulfur vapor can be put, for any process which employs sulfur vapor as a reactant at any temperature can be served by the apparatus. All that is necessary is appropriate regulation of the boiler temperature and pressure to generate the volume of sulfur vapor needed at the pressure and temperature desired.

Referring more particularly to Figure 2, there is shown a heater 27' which may be substituted for the heater 27 of Figure 1 where thermal circulation of the sulfur is used instead of forced circulation. In the event a heater of the type shown in Figure 2 is used, the pump 23 will be eliminated. In this case liquid sulfur at or near its boiling point, from the drum 9 will enter through the line 25 into the header 40 at the bottom of the heater and will pass upwardly through the parallel tubes 41 to the upper header 42. Molten sulfur and sulfur vapors will leave the heater through line 29 and pass to drum 9 as shown and described in connection with Figure 1. A suitable heating element such as a gas burner 43 is provided in the bottom of heater 27' and a flue 44 is provided at the top of the heater through which combustion gases escape.

It will be seen, therefore, that we have devised a novel method and apparatus for producing sulfur vapors from crude sulfur which vapors may be condensed or may be used directly in chemical processes such as for example, preparation of carbon disulfide.

It is claimed:

1. The method of vaporizing crude sulfur comprising charging crude molten sulfur directly to a closed vaporizing zone, maintaining a body of molten sulfur in said zone, withdrawing scrum from the surface of said body of sulfur and withdrawing sludge from beneath said body of sulfur, continuously circulating sulfur substantially free of scum and sludge from said sulfur body to a tubular heater and back to said vaporizing zone, heating the sulfur in said heater sufficiently to vaporize sulfur in said zone, withdrawing sulfur vapors from said vaporizing zone and eliminating said scum and sludge from the system without passing through said tubular heater.

2. Method in accordance with claim 1 in which the sulfur is withdrawn from an intermediate point in said body of sulfur in the vaporizing zone for circulation to said tubular heater and back to the vaporizing zone.

CHARLES A. PORTER.
GEORGE W. ROLLIN.

REFERENCES CITED

The following references are of record in the file of this patent:

UNITED STATES PATENTS

| Number | Name | Date |
|---|---|---|
| 1,960,686 | Tumim | May 29, 1934 |
| 2,046,818 | Harkness | July 7, 1936 |
| 2,113,230 | Ceccon | Apr. 5, 1938 |
| 2,149,373 | Vincent et al. | Mar. 7, 1939 |
| 2,169,261 | Lee et al. | Aug. 15, 1939 |
| 2,312,706 | Freeman | Mar. 2, 1943 |
| 2,481,411 | Grace et al. | Sept. 6, 1949 |
| 2,498,089 | Lippman, Jr. | Feb. 21, 1950 |